(12) United States Patent
Beardsley

(10) Patent No.: US 7,823,391 B2
(45) Date of Patent: Nov. 2, 2010

(54) TURBINE ENGINE ARRANGEMENT

(75) Inventor: Peter K. Beardsley, Derby (GB)

(73) Assignee: Rolls-Royce PLC, London (GB)

( * ) Notice: Subject to any disclaimer, the term of this patent is extended or adjusted under 35 U.S.C. 154(b) by 550 days.

(21) Appl. No.: 11/144,632

(22) Filed: Jun. 6, 2005

(65) Prior Publication Data

US 2006/0021323 A1 Feb. 2, 2006

(30) Foreign Application Priority Data

Jul. 9, 2004 (GB) ................................ 0415376.3

(51) Int. Cl.
*F02C 7/275* (2006.01)
*F02C 6/04* (2006.01)

(52) U.S. Cl. .......................................... 60/788; 60/785

(58) Field of Classification Search ........... 60/748–788, 60/39.183, 802, 224, 225, 798
See application file for complete search history.

(56) References Cited

U.S. PATENT DOCUMENTS

| | | | | |
|---|---|---|---|---|
| 2,608,054 | A * | 8/1952 | Price .............................. | 60/787 |
| 2,908,189 | A | 10/1959 | Parker et al. | |
| 2,959,918 | A * | 11/1960 | West ............................. | 60/788 |
| 3,145,532 | A | 8/1964 | Moss | |
| 5,143,329 | A | 9/1992 | Coffinberry | |
| 5,546,742 | A * | 8/1996 | Shekhawat et al. ............ | 60/788 |
| 5,694,765 | A | 12/1997 | Hield et al. | |
| 2004/0011018 | A1 | 1/2004 | Bouiller et al. | |
| 2006/0010875 | A1* | 1/2006 | Mahoney et al. .............. | 60/772 |
| 2006/0260323 | A1* | 11/2006 | Moulebhar ................... | 60/793 |
| 2007/0089420 | A1* | 4/2007 | Klingels ....................... | 60/772 |

FOREIGN PATENT DOCUMENTS

| | | |
|---|---|---|
| EP | 0 200 178 A | 11/1986 |
| EP | 1 186 761 A | 3/2002 |
| GB | 987878 | 3/1965 |
| WO | WO 2005/054645 A | 6/2005 |

* cited by examiner

*Primary Examiner*—Michael Cuff
*Assistant Examiner*—Gerald L Sung
(74) *Attorney, Agent, or Firm*—Oliff & Berridge, PLC

(57) ABSTRACT

A turbine engine arrangement incorporates an electrical machine combination which can act as a generator or motor. Thus, the combination during initial turbine engine arrangement start-up acts through this motor to drive shaft rotation. This shaft rotation creates core compressed air which is bled through a valve to an air turbine such that the electrical machine when acting as a motor or generator at low engine loads is appropriately cooled. The arrangement also includes a compressor fan which generates an airflow utilised by the air turbine in order to drive the electrical machine as a generator of electrical power when engine conditions dictate. A duct is provided to direct airflow exhausted from the air turbine to a heat exchanger arranged to exchange heat with a bypass flow from the compressor fan. In such circumstances, the generators can operate substantially independently of rotational speed of the engine shafts within the core whilst bled air through the valve acts to cool the electric machine during initial start-up. Generally, a gearbox is provided whereby matching of air turbine rotation with generator requirements is achieved whilst also through a coupling allowing connection to the primary drive shaft of the core to either allow engine start-up or driving of the generators when engine speed is appropriate.

7 Claims, 1 Drawing Sheet

TURBINE ENGINE ARRANGEMENT

Figure 1:
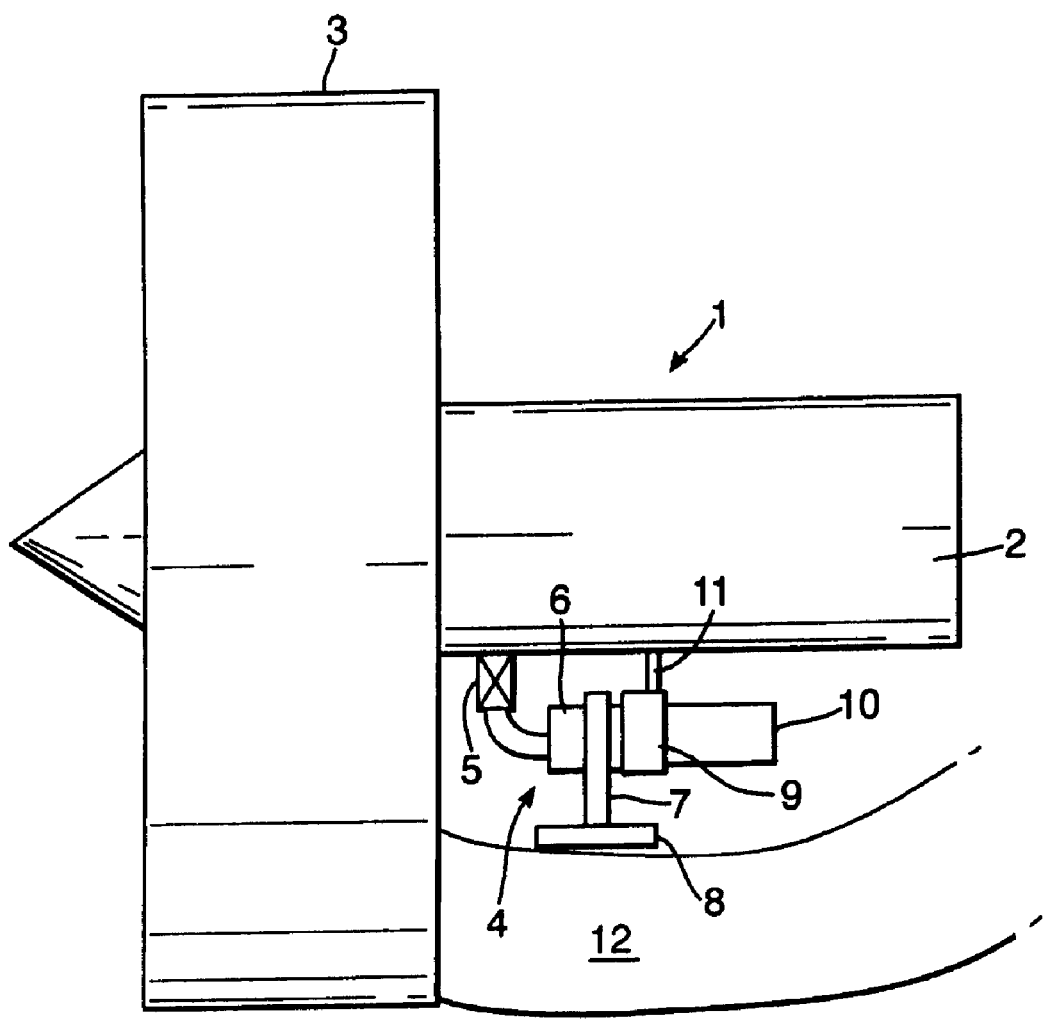

The present invention relates to turbine engine arrangements and more particularly to electrical machines associated with turbine engine arrangements in order to provide electrical power generation.

Operation of turbine engines is relatively well known and clearly involves airflows which pass through compressor and turbine stages in order to generally provide propulsion in an aircraft or usable power in a stationary engine. An electrical starter motor may be provided in order to create initial rotation of the compressor and turbine stages such that there is engine pick-up upon combustion. Subsequently, the starter motor is then decoupled in order to avoid drag upon the engine. Alternatively, and particularly with aerospace applications, a pneumatic starter may be used.

More recently the starter motor has more generally been configured as an electrical machine whereby at engine start-up it can as indicated previously provide short term engine rotation before combustion pick-up and subsequently take power, normally through the same coupling, in order to generate electrical current for engine operations and other functions such as air conditioning equipment. It will be understood with increasing amounts of control equipment and possibly ancillary apparatus such as air conditioning equipment there is an increasing demand for electrical power. Thus, there is a desire to more conveniently generate such electrical power whilst limiting any diminishment in underlying turbine engine operation.

In accordance with the present invention there is provided a turbine engine arrangement comprising an electrical machine selectively coupled to a prime driver of the arrangement to alternatively provide engine start-up and/or electrical power generation, the arrangement characterised in that the electrical machine is associated with an air turbine which in use is driven by airflow through the engine arrangement so that the electrical machine acts to generate electrical power.

Typically the exhaust airflow from the air turbine is passed to a cooling arrangement for the electrical machine.

Normally, the electrical machine is a so called variable frequency starter generator or VFSG.

Generally, the airflow through the engine arrangement is taken from a compressor stage of that arrangement.

Generally, the electrical machine is selectively coupled to a prime driver of the arrangement through a clutch. Normally, the clutch is arranged for decoupling of the electrical machine after initial turbine engine arrangement start-up.

Normally, at engine start-up air bleed flow is taken from an engine arrangement core to allow for oil cooling within the electrical machine.

Also in accordance with the present invention there is provided an electrical machine for a turbine engine, the electrical machine selectively coupleable to a prime driver for alternatively providing engine start-up and/or electrical power generation, the electrical machine characterised in that there is an air turbine which in use is driven by airflow through an engine arrangement so that the electrical machine acts to generate electrical power.

An embodiment of the present invention will now be described by way of example only with reference to the accompanying drawing of a schematic side view of a turbine engine arrangement.

Clearly, in order to initiate turbine engine operation it is necessary to drive rotation of the various shafts of that engine between the compressor stages and turbine stages such that combustion will then pick up engine operation to a steady state. In order to achieve that initial start-up an electric motor is usually utilised to turn the shafts through a gearbox and selective clutch. This electric motor must be cooled and this is normally achieved through cooling oil circulation about the start-up motor.

As indicated above, there is generally an increase in the requirement for electrical power such that the electric start-up motor will also be utilised as an electric machine when it is itself driven by the turbine engine operation. Thus, the electric motor acts as an electrical power generator. Previously, cooling of such generators was achieved through air to oil heat exchangers located within compressor fan bypass ducting airways. The airflow through those airways cools the oil circulated through the generator so that the generator remains within acceptable temperature ranges. Clearly, this is inconvenient and the more recent development of a combined electric start-up motor and electric generator, known as a variable frequency starter generator in order to both initially start the engine and extract electrical power, has been well received.

Variable frequency starter generators still require oil cooling during initial start-up. Thus, as there is no bypass airflow during start-up sequences it is necessary to provide additional cooling function during such start-up periods.

In accordance with the present invention utilisation is made of the core compressor airflow. As the core compressor is driven by the electric motor during start-up there is an airflow which will be at a higher pressure and so can be used to provide cooling of the variable frequency starter generator.

Referring to the drawing as can be seen in a turbine engine arrangement 1, a turbine engine core 2 is associated with a compressor fan 3 with an electric machine combination 4 arranged to act as both a starter for the core 2 as well as an electrical power generator subsequently. A bleed valve 5 provides airflow to an air turbine 6 such that during start-up coolant air is bled from the core 2, through the valve 5, through the turbine 6 to become incident upon an exhaust duct 7 to a heat exchanger 8. The bled airflow through the valve 5 acts to cool a generator 10 during such initial engine start-up.

It will be understood that during engine start-up the electric machine 4 itself generates through a coupling 11 rotation of the core 2 and in particular shafts within that core 2 in order to initiate engine start-up. This coupling 11 is connected to a drive shaft within the core 2 during normal operational conditions. However, during low engine power conditions in order to maintain electrical power generator speed this coupling 11 is de-clutched such that core airflow through the compressor becomes incident upon the air turbine 6 such that rotation of that air turbine 6 causes rotation of the generators 10 and therefore continued electrical power generation. It will also be understood that this airflow also entering the air turbine 6 and exhausting that air turbine 6 will itself be diverted by the duct 7 into the heat exchanger 8 in order to provide cooling of the generator as described above.

The heat exchanger 8 is generally positioned in the bypass airflow 12 of the compressor fan 3. Thus, the heat exchanger 8 cools the air flow into the generators for efficient cooling of those generators 10.

An electric machine is constituted by generators 10 which also during start-up act as an electric motor in order to drive shaft rotation in the core 2. The generators or electric machines are coupled through the accessory gearbox 9 in order to achieve the desired rotational speed and mechanical advantage as required. As indicated previously the coupling 11 incorporates a clutch mechanism to engage the electric machines (generators or electric motor) to the main or prime driver shaft of the engine 1. Thus, through the gearbox 9 the electric motor configuration of the electric machine will act to start rotation and therefore initiate start-up of the engine 1 whilst during generation phases that clutch will either provide power to the generator in order to generate rotation and therefore electrical power during adequate or normal engine speed operating conditions whilst at low engine power conditions the coupling 11 will allow dis-engagement of the clutch such that the generators 10 can then be driven by the air turbine 6 again through the gearbox 9 in order to maintain rotational speed in the generator 10 for efficient electrical power generation.

During a start-up sequence, with an electric machine such as a variable frequency starter generator (VFSG) engaged through the coupling 11 it will be understood that through the VFSG the main gearbox/primary driver for the core 2 is driven in order to create compressed air which then runs through the air turbine 6 via the bleed valve 5. This bled airflow as indicated previously is presented to an exhaust duct 7 and then passes to the heat exchanger 8 for cooling.

When desired, with the engine 1 running, the clutch arrangement in the coupling 11 is dis-engaged and the VFSG is then solely powered by turbine 6 rotation. Exhausted airflow from the turbine 6, which is cooled via turbine expansion, is then used to cool the generator 10 and also possibly the gearbox 9.

By providing the bleed valve 5 it will be understood that engine core compressed air is utilised when there is inadequate compressor fan through airflow in order to cool the generator/motor 9 in an initial start-up cycle for the engine 1.

It will be understood that electrical power demands are generally independent of actual engine 1 power thrust requirements. The present invention allows through the use of the air turbine 6 that the generators 10 can be run at a rotational speed substantially independent of engine shaft speed. Provided there is adequate airflow through the compressor fan 3 it will be understood that the air turbine 6 will rotate and then through the gearbox 9 a rotational speed will be translated to the generators 10.

As indicated above use of the air turbine 6 in itself provides a means to ensure that there is cooling of the generators 10. The proportion of airflow from the compressor fan 3 which passes through the air turbine 6 is directed through ducting 7 to the heat sink/exchanger 8 to facilitate such cooling.

In the above circumstances it will be understood that the present turbine engine arrangement can more conveniently generate electrical power and/or allow initial start-up of a turbine engine over a wider range of engine operational conditions.

As indicated above, and particularly with respect to aerospace engines, pneumatic engine start devices are used. Thus, if there is no electrical power available the engine can be started by compressed air from an airline. In accordance with the present invention that compressed air may be presented to the air turbine 6 in order to provide initial start up of an engine.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A turbine engine arrangement comprising: an electrical machine selectively coupled to either a turbine engine core of the arrangement to alternatively provide engine start-up and electrical power generation or an air turbine to provide electrical power generation; wherein during a first engine power condition, the electrical machine is selectively coupled to the turbine engine core, whereby the electrical machine generates electrical power, and wherein during a second engine power condition that is a lower engine power condition than the first engine power condition, the electrical machine is decoupled from the turbine engine core and is coupled to the air turbine that is driven by airflow through the engine arrangement, whereby the electrical machine generates electrical power, wherein the electrical machine is capable of being decoupled from the turbine engine core and being coupled to the air turbine while the turbine engine core is running.

2. An arrangement as claimed in claim 1 wherein the electrical machine is a variable frequency starter generator or VFSG.

3. An arrangement as claimed in claim 1 wherein the airflow through the engine arrangement is taken from a compressor stage of the arrangement.

4. An arrangement as claimed in claim 1 wherein the electrical machine is selectively coupled to the turbine engine core of the arrangement through a clutch.

5. An arrangement as claimed in claim 4 wherein the clutch is arranged for decoupling of the electrical machine after initial turbine engine arrangement start-up.

6. An arrangement as claimed in claim 1 wherein at engine start-up air bleed flow is taken from an engine arrangement core to allow for oil cooling within the electrical machine.

7. An arrangement as claimed in claim 1, wherein exhaust airflow from the air turbine is passed to a cooling arrangement for the electrical machine.

\* \* \* \* \*